(12) United States Patent
Dollie et al.

(10) Patent No.: US 7,125,004 B2
(45) Date of Patent: Oct. 24, 2006

(54) LIQUID DISTRIBUTOR FOR USE IN MASS TRANSFER COLUMN

(75) Inventors: Yusuf Omar Dollie, Aesch bei Neftenbach (CH); Juergen Muller, Viernheim (DE); Izak Nieuwoudt, Wichita, KS (US); John Gommers, Saas Van Gent (NL); Rainer Käshammer, Weinheim (DE); Christoph Ender, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 11/010,636

(22) Filed: Dec. 13, 2004

(65) Prior Publication Data

US 2005/0189663 A1    Sep. 1, 2005

Related U.S. Application Data

(60) Provisional application No. 60/529,509, filed on Dec. 15, 2003.

(51) Int. Cl.
    *B01F 3/04*    (2006.01)
(52) U.S. Cl. ......................................... 261/97; 261/110
(58) Field of Classification Search .................. 261/97, 261/98, 99, 110
    See application file for complete search history.

(56) References Cited

U.S. PATENT DOCUMENTS

| | | | | |
|---|---|---|---|---|
| 3,360,246 A | * | 12/1967 | Eckert | .......................... 261/98 |
| 3,392,967 A | * | 7/1968 | Eckert | .......................... 261/98 |
| 3,937,769 A | * | 2/1976 | Strigle et al. | .................. 261/97 |
| 4,416,835 A | * | 11/1983 | Bosne | ......................... 261/110 |
| 4,729,857 A | * | 3/1988 | Lee et al. | ..................... 261/97 |
| 4,816,191 A | | 3/1989 | Berven et al. | |
| 4,846,266 A | | 7/1989 | Acker et al. | |
| 4,855,089 A | | 8/1989 | Michels | |
| 4,909,967 A | | 3/1990 | Binkley et al. | |
| 5,051,214 A | * | 9/1991 | Chen et al. | .................... 261/97 |
| 5,906,773 A | * | 5/1999 | Hausch et al. | ................. 261/97 |
| 6,042,090 A | | 3/2000 | Zablonier et al. | |
| 6,059,272 A | | 5/2000 | Potthoff et al. | |
| 6,390,454 B1 | * | 5/2002 | Urbanski et al. | ......... 261/114.1 |
| 6,502,806 B1 | | 1/2003 | Richardson | |
| 6,527,258 B1 | | 3/2003 | Bartlok | |
| 6,540,213 B1 | | 4/2003 | Bachmann et al. | |
| 6,575,437 B1 | | 6/2003 | Fischer et al. | |

(Continued)

FOREIGN PATENT DOCUMENTS

EP    0 282 753 B1    9/1988

(Continued)

*Primary Examiner*—Scott Bushey
(74) *Attorney, Agent, or Firm*—Hovey Williams LLP (57) ABSTRACT

A flow distributor for liquid descending in a vertically elongated process column having an internal space. The distributor is made up of an elongated liquid distribution trough configured and arranged for being mounted in a process column in a position to extend across the internal space thereof. The trough has outer walls defining an elongated, longitudinally extending internal fluid distribution chamber and includes outlet holes which extend through the walls at locations permitting liquid to escape laterally outwardly from the trough. The distributor also includes a baffle distributor structure made up of an elongated, downwardly extending distributor plate member disposed adjacent the trough in a position such that at least a portion of a surface thereof is contacted by liquid escaping from said hole. The distributor also includes an elongated, fluid receiving element attached at a lower edge portion of said plate member presenting an elongated fluid distribution channel extending longitudinally of the plate member.

9 Claims, 6 Drawing Sheets

U.S. PATENT DOCUMENTS

| | | |
|---|---|---|
| 2001/0038155 A1 | 11/2001 | Bachmann et al. |
| 2002/0041040 A1 | 4/2002 | Fischer et al. |
| 2002/0079597 A1 | 6/2002 | Bartlok |
| 2002/0158350 A1* | 10/2002 | Ender et al. .................. 261/97 |

FOREIGN PATENT DOCUMENTS

| | | |
|---|---|---|
| EP | 0 501 615 A2 | 9/1992 |

* cited by examiner

LIQUID DISTRIBUTOR FOR USE IN MASS TRANSFER COLUMN

CROSS-REFERENCE TO RELATED APPLICATION

Priority benefits under 35 U.S.C. §119(e) are claimed in this application from provisional application Ser. No. 60/529,509, filed on Dec. 15, 2003, the entirety of the disclosure of which is hereby specifically incorporated herein by this reference thereto.

BACKGROUND OF THE INVENTION

1. Field of the Invention

The present invention relates generally to mass transfer and heat exchange columns and, more particularly, to liquid distributors used in such columns and methods of distributing liquid using such liquid distributors.

2. The Prior Art Background

In mass transfer and heat exchange columns, liquid and vapor streams are brought into contact with each other to effect mass transfer and/or heat exchange between the liquid and vapor. One or more beds of structured or random packing are typically used to facilitate intimate contact between the liquid and vapor and thereby enhance the desired mass transfer and/heat exchange. The liquid stream typically descends through the packing bed while the vapor stream ascends through the packing bed in countercurrent relationship to the flow of the liquid stream.

Uneven horizontal distribution of the liquid stream as it enters the packing bed is undesirable because it reduces the area of contact between the liquid and vapor and thus decreases the mass transfer and/or heat exchange between the liquid and vapor. To ensure proper operation of the column, it is also important to ensure that the ratio of liquid to vapor is constant over the cross-section of the column. For this reason, it is important to have an even distribution of liquid as it enters the packing bed. Various types of liquid distributors are used in attempts to facilitate the horizontal distribution of liquid as it enters the packing bed from an overlying region in the column. In general, these distributors deliver the liquid to the packing bed at a number of spaced apart locations, commonly referred to as "drip-points." The drip-point density is a measure of the number of drip-points per unit area and is commonly used to measure the distribution performance of liquid distributors.

One known type of liquid distributor uses a plurality of elongated, parallel troughs to horizontally distribute the liquid to the underlying packing bed. Liquid is distributed to the troughs by a feed box that extends perpendicularly to the parallel troughs. In one arrangement, the feed box is positioned on top of the parallel troughs and delivers liquid to the parallel troughs through a plurality of holes in the floor and/or side walls of the feed box. In another arrangement, the parallel troughs extend outwardly from the sides of the feed box and liquid flows into the parallel troughs through openings in the side walls of the feed box. In one general type of distributor, such as disclosed in U.S. Pat. No. 4,855,089 to Michels and in U.S. Pat. No. 4,816,191 to Berven et al., splash baffles are spaced outwardly from the side walls of the parallel troughs to receive liquid exiting from the parallel troughs. The liquid then flows down the splash baffles and drips into the packing bed along a drip line. It is also known to include a number of horizontally extending corrugations in the splash baffles. In a further type of distributor disclosed in EP 0 42 615 A2, drip tubes descend from the parallel troughs and deliver liquid to a multi-port distributor plate that multiplies the number of drip points into the underlying packing bed.

One problem associated with known types of liquid distributors is the difficulty in ensuring uniform horizontal distribution of liquid at low liquid flow rates. A need has thus developed for a liquid distributor that is capable of facilitating uniform liquid mixing and horizontal distribution at low liquid flow rates.

SUMMARY OF THE INVENTION

In one particular aspect, the present invention is directed to a liquid distribution system comprising an elongated feed box and a plurality of elongated liquid distribution troughs in fluid flow communication with the feed box. The troughs may desirably be spaced apart and preferably lie in a common plane in parallel relationship to each other. In one embodiment, the troughs may underlie the feed box and openings are provided in a floor and/or one or both side walls of the feed box to deliver liquid from the feed box to each of the troughs. In another embodiment, the troughs may extend outward from opposed side walls of the feed box and openings are provided in the side walls to allow liquid to flow from the feed box to the troughs. The troughs may have a square, rectangular, circular, oval or other configuration when viewed in vertical cross section. Each trough may also include openings positioned in a floor and/or one or both side walls of the trough to allow liquid to exit from the trough. A baffle distributor is positioned to receive the liquid exiting from each trough and facilitate the horizontal distribution of the liquid prior to delivery of the liquid to an underlying mass transfer bed, such as a bed of random, structured or grid-type packing.

The baffle distributor may desirably comprise a splash plate positioned to receive the flow of at least some of the liquid exiting the associated trough. The splash plate may extend vertically or it may be inclined toward the associated trough in the downward direction. The splash plate may include a liquid spreading surface that functions to deflect the downward flow of liquid and cause horizontal spreading of the liquid as it descends on the liquid spreading surface. Each baffle distributor may also include an elongated channel that is positioned under the troughs in a position to receive liquid from an associated liquid spreading surface. The channels are preferably coplanar and extend parallel to each other. The channels may extend in parallel relationship to the overlying troughs or they may extend at a preselected angle to the longitudinal axis of the troughs. The channels have a plurality of spaced apart liquid discharge holes that deliver liquid to the underlying mass transfer bed at a number of drip points corresponding to the number of liquid discharge holes. A filler formed of a porous liquid permeable material is preferably placed within each channel to facilitate the horizontal distribution of the liquid within the channel prior to entry into the liquid discharge holes.

The channels each have an overflow weir, preferably of a saw-toothed design, that provides for the controlled discharge of any overflow of liquid from the channels. A drip edge having a similar saw-toothed design extends downwardly from the trough to receive liquid traveling along the outer surface of the trough. The drip edge is preferably positioned in vertical alignment with the channel so that liquid drips off the drip edge and falls into the channel for horizontal distribution prior to entry into the underlying mass transfer bed. The described liquid distributor provides for good liquid mixing and horizontal distribution of the liquid at low liquid flow rates as well as high liquid flow rates.

In one very important aspect thereof, the invention provides a flow distributor for liquid descending in a vertically elongated process column having an internal space. In accordance with this aspect of the invention, the distributor may include an elongated liquid distribution trough configured and arranged for being mounted in a process column in a position to extend transversely of the column in the internal space. Desirably, the trough may include an outer wall structure defining an elongated, longitudinally extending internal fluid distribution chamber and at least one outlet hole extending through the wall structure at a location to permit liquid to escape laterally outwardly from the trough. The flow distributor may also desirably include a baffle distributor structure having (1) an elongated, downwardly extending distributor plate member disposed adjacent the trough in a position such that at least a portion of a surface thereof is contacted by liquid escaping from the hole and (2) an elongated, fluid receiving element attached at a lower edge portion of the plate member. Ideally, in accordance with this aspect of the invention, the fluid receiving element may include an elongated fluid distribution channel extending longitudinally of the plate member.

In further accordance with the concepts and principles of the invention, the elongated, downwardly extending distributor plate member may be configured and arranged so as to extend transversely of the column in the internal space thereof in a direction that is in essential parallelism relative to the elongated liquid distribution trough when the distributor is mounted in a process column. Alternatively, the elongated, downwardly extending distributor plate member may be configured and arranged so as to extend transversely of the column in the internal space thereof in a direction that is at an angle relative to the elongated liquid distribution trough when the distributor is mounted in a column.

More specifically, the outer wall structure of each trough may comprise a pair of spaced apart upright walls having lower edges and a floor that interconnects the lower edges. In addition, the outlet hole may desirably be positioned in one of the upright walls, and the trough may ideally include a secondary hole positioned at a higher elevation than the outlet hole.

Desirably, the channel of the receiving element may be arcuate or perhaps even circular in transverse cross-sectional configuration. Alternatively, the transverse cross-sectional configuration may be of any multi-sided shape such as square, rectangular, triangular, etc.

In one particularly preferred form of the invention, the fluid receiving element may have an upwardly extending outer edge disposed at an opposite side of the channel from the lower edge portion of the plate member. Furthermore, the fluid receiving element may include a porous, liquid permeable filler material disposed in the channel. Desirably, the fluid receiving element may also include structure for holding the filler material in place and the channel may be disposed directly beneath the trough for essentially its entire length.

Preferably, the fluid receiving element may be essentially coextensive in length with the elongated distributor plate member, the channel may have an open top and the fluid receiving element may include at least one drip hole in the wall structure at a lower portion of the channel.

Ideally, the fluid receiving element and the elongated distributor plate member may be integrally connected and formed by bending a metal sheet. Also, the upwardly extending outer edge of the fluid receiving element may comprise an outlet weir for the channel.

In accordance with preferred aspects of the invention, the distributor plate member may include a liquid spreading element disposed at a lower area of the surface and positioned beneath the portion thereof that is contacted by liquid escaping from the hole. Desirably the liquid spreading element may comprise a sheet of expanded metal which ideally may have a vertically oriented diamond pattern.

In accordance with a further important aspect of the invention, a flow distributor is provided which includes an elongated liquid distribution trough configured and arranged for being mounted in the column in a position to extend transversely of the column in the space. The trough may desirably include an outer wall structure defining an elongated, internal fluid distribution chamber and there may be at least one hole extending through the wall at a location to permit liquid to escape from the chamber and flow downwardly along an outer surface of the trough. In accordance with this aspect of the invention, the flow distributor may also include an elongated drip element carried by the trough. The drip element desirably extends longitudinally of the trough structure and downwardly therefrom, and the same desirably is disposed beneath the hole in the trough and has a lower longitudinally extending drip edge.

In accordance with this aspect of the invention, the outer wall structure of the trough comprises a pair of spaced apart upright walls having lower edges and a floor that interconnects the lower edges. The hole in the trough may be either in one of the upright walls or in the floor. When the hole is in an upright wall, the drip element is desirably attached to the same upright wall. Alternatively, when the hole is in the floor, the drip element is desirably attached to the floor. In one particularly preferred form of the invention, the floor is downwardly V-shaped in transverse cross-sectional configuration and the elongated drip element is attached to an apex of the V-shaped configuration.

In another important aspect of the invention, the flow distributor includes a trough as described above and a baffle distributor structure made up of an elongated, downwardly extending distributor plate member is disposed adjacent the trough in a position such that at least a portion of a surface thereof is contacted by liquid escaping from the hole. In accordance with this specific aspect of the invention, the distributor plate member includes a liquid spreading element at a lower area of the surface disposed beneath the portion of the surface that is contacted by liquid escaping from the hole.

In further accordance with the concepts and principles of the invention, the same provides a flow distributor for liquid descending in a vertically elongated process column having an internal space. In accordance with this aspect of the invention, the flow distributor includes an elongated liquid distribution trough as described above and a baffle distributor structure that includes an elongated, downwardly extending distributor plate member disposed adjacent the trough in a position such that at least a portion of a surface thereof is contacted by liquid escaping from the hole. Ideally, in further accordance with this aspect of the invention, the distributor plate member is disposed so as to extend laterally of the trough.

The invention further provides apparatus for feeding liquid descending in an internal space of a vertically elongated process column to a flow distributor. Thus, in further accordance with the invention, the apparatus includes an elongated feedbox structure configured and arranged for being mounted in a process column in a position so as to extend across the interior space of the column. Desirably, the feedbox structure includes an outer wall assembly defining an elongated, longitudinally extending internal fluid distribution zone. At least one outlet hole extending through the wall structure is provided at a location to permit liquid to escape from the zone and flow downwardly in the column. In accordance with this form of the invention, the apparatus also includes a predistributor trough disposed in the zone. This predistributor trough includes a wall arrangement defining an internal area and providing apertures allowing liquid to flow from the internal area and into zone.

In yet another form, the invention provides apparatus for feeding liquid descending in an internal space of a vertically elongated process column to a flow distributor. In accordance with this form of the invention, the apparatus includes an elongated feedbox structure configured and arranged for being mounted in a process column in a position to extend transversely of the column in the internal space thereof. The feedbox structure includes an outer wall assembly defining an elongated, longitudinally extending internal fluid distribution zone. The apparatus also includes an elongated liquid distribution trough including a cylindrical outer wall structure defining an elongated, longitudinally extending internal fluid distribution chamber. In accordance with this form of the invention, the trough is arranged to extend through the wall assembly and into the zone, and the same includes an opening positioned to allow liquid to flow from the zone and into the chamber, and at least one outlet hole extending through the wall structure at a location to permit liquid to escape therefrom and flow downwardly in the internal space. In accordance with the specific preferred aspects of the invention, the opening is ideally positioned in a lower area of the outer wall structure and the same is arranged to face generally downwardly so that liquid from the zone flows upwardly into the chamber.

DESCRIPTION OF THE PREFERRED EMBODIMENTS

Figure 1:
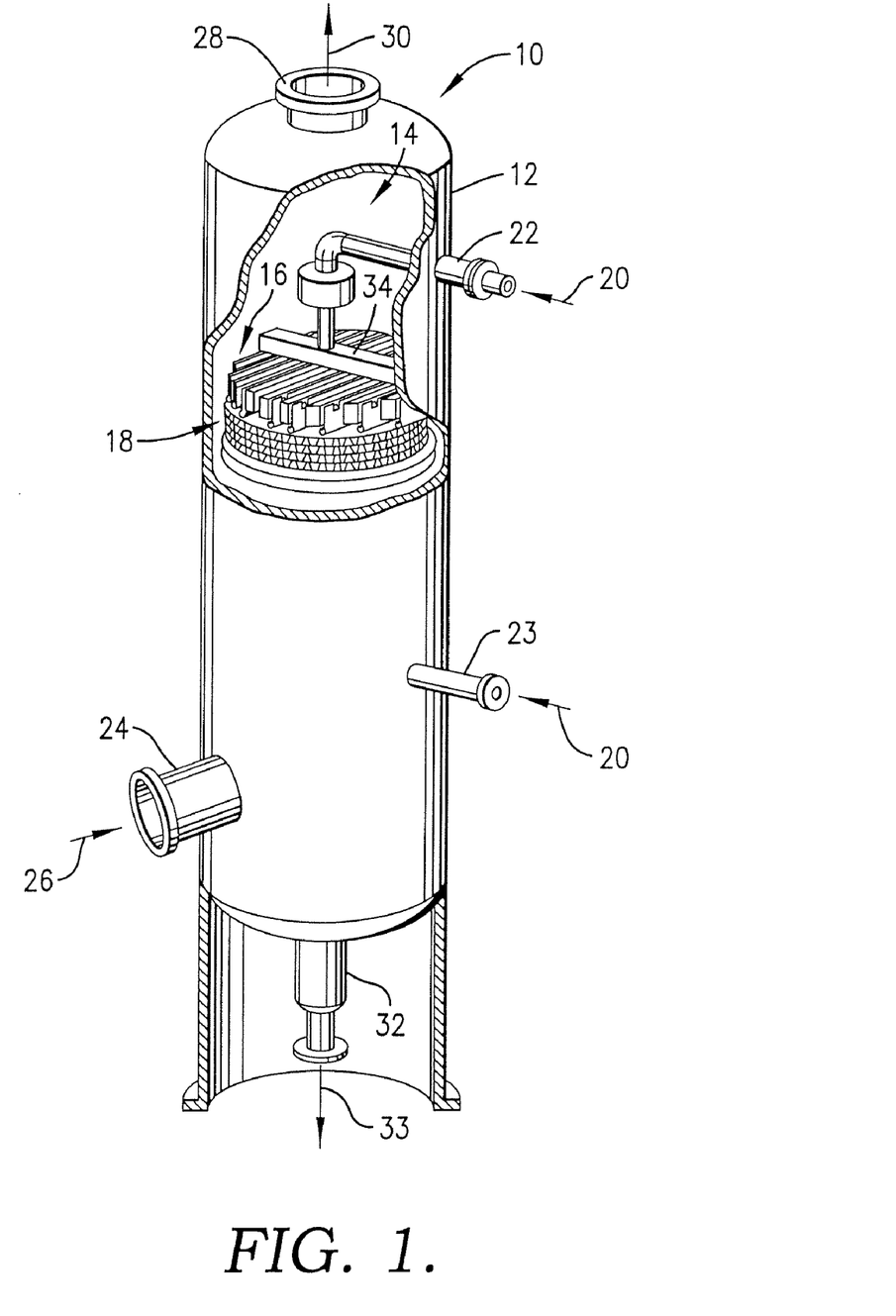
FIG. 1 is a side perspective view of a mass transfer column with portions of a shell of the column broken away to show a mass transfer bed and one embodiment of a liquid distributor of the present invention positioned within an open internal region of the column.

Turning now to the drawings in greater detail, and initially to FIG. 1, a mass transfer or heat exchange column is designated generally by the numeral 10 and includes an upright cylindrical shell 12 that defines an open interior region 14 in which one or more liquid distributors 16 of the present invention and one or more mass transfer beds 18 are located. The liquid distributor 16 is used to facilitate a more uniform horizontal distribution of one or more descending liquid streams as it enters the upper end of the underlying mass transfer bed 18. The mass transfer bed comprises one or more types of mass transfer devices, including but not limited to those conventionally known as structured, grid or random packing.

Column 10 is of a type used to process liquid and vapor streams, including to obtain fractionation products. Although column 10 is shown in a cylindrical configuration, other shapes, including polygonal, may be used. Column 10 is of any suitable diameter and height, and is constructed from suitably rigid materials that are preferably inert to, or otherwise compatible with the fluids and conditions present within the column 10.

Liquid streams 20 are directed to the column 10 through feed lines 22 and 23 positioned at appropriate locations along the height of the column 10. Feed line 22 normally carries only liquid and feed line 23 may carry liquid, vapor and a mixture of liquid and vapor. Although only two liquid feed lines 22 and 23 are shown in the drawings for simplicity of illustration, it will be appreciated by those of ordinary skill in the art that additional liquid feed lines may be utilized if desired. Similarly, only one vapor feed line 24 carrying a vapor stream 26 is illustrated, but additional vapor feed lines can be included if necessary or desired for the vapor and liquid processing occurring within the column 10. It will also be appreciated that the vapor stream 26 can be generated within the column 10 rather than being introduced into the column 10 through the feed line 24. The column 10 further includes an overhead line 28 for removing a vapor product or byproduct 30 from the column 10. A bottom stream takeoff line 32 is provided for removing a liquid product or byproduct 33 from the column 10. Other column components such as reflux stream lines, reboilers, condensers, vapor horns and the like may be present but they are not illustrated because they are conventional in nature and are not believed to be necessary for an understanding of the present invention.

Figure 2:
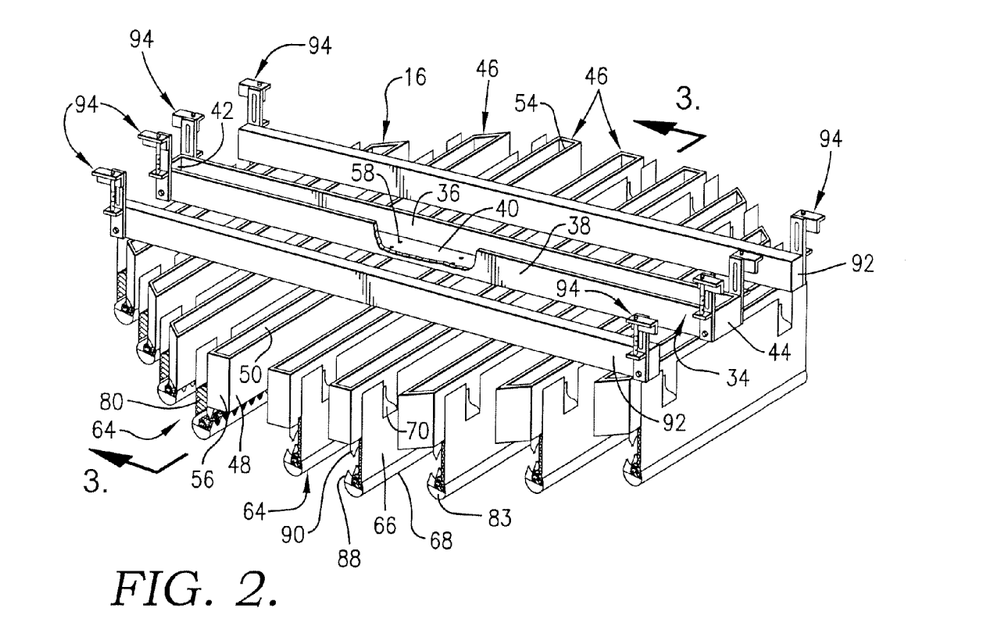
FIG. 2 is a top perspective view of the liquid distributor shown in FIG. 1 with a portion of a feed box shown broken away to show liquid exit holes positioned in a floor of the feed box.
Figure 3:
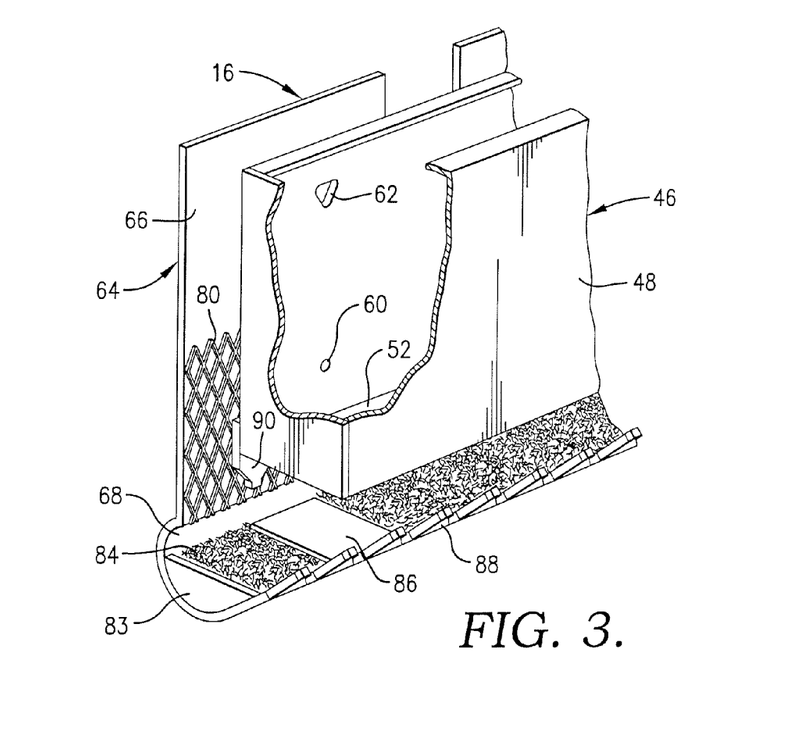
FIG. 3 is a side elevation view of a fragmental portion of a trough and baffle distributor of the liquid distributor taken along line 3—3 of FIG. 2.
Figure 4:
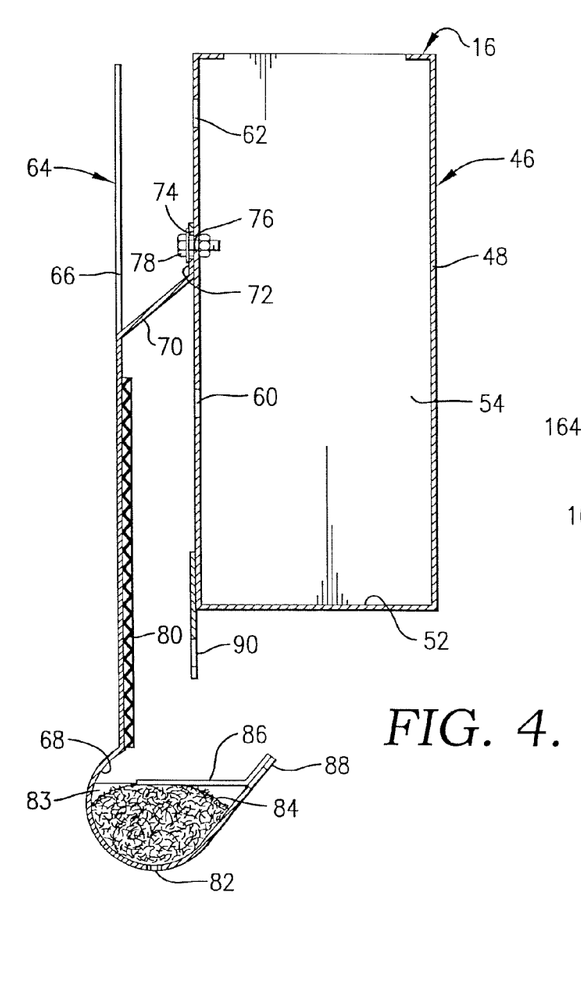
FIG. 4 is an end elevation view of the trough and baffle distributor of FIG. 3 taken in vertical section.

Turning additionally to FIGS. 2–4, the liquid distributor 16 in one embodiment of the present invention includes an elongated central feed box 34 that receives liquid from a descending liquid stream, such as the liquid stream 20 that has been delivered by the liquid feed line 22 to the open internal region of the column 10. It will be appreciated that the feed box 34 need not receive liquid directly from the outlet of the liquid feed line 22, but the liquid may instead be first subjected to one or more processing steps and then collected by a collector (not shown) for delivery to the feed box 34. The feed box 34 extends horizontally in a first direction and is of a length corresponding to the diameter of the column 10 or at least a substantial portion thereof. The feed box 34 is preferably positioned along the column diameter, but it will be understood that more than one feed box 34 can be used and positioned at preselected locations.

The feed box 34 comprises a pair of spaced apart side walls 36 and 38 that are connected at their lower edges by a floor 40 and at their ends by end walls 42 and 44. An optional cover (not shown) may connect the upper edges of the side walls 36 and 38 to prevent liquid from spilling over the side walls 36 and 38, such as when the column 10 is subjected to a rocking motion in off-shore applications. If the cover is used, a suitable opening is provided in the cover to permit liquid to be delivered to the feed box 34.

The feed box 34 feeds liquid to a plurality of elongated troughs 46 that preferably extend generally parallel to each other in a direction that is at an angle, preferably perpendicular, to the orientation of the feed box 34. The troughs 46 may desirably, but not necessarily extend across the entire cross section of the column 10, and the number of troughs 46 is selected to provide the desired drip-point density in the underlying mass transfer bed 18. The troughs 46 are constructed in a manner similar to the feed box 34 and have spaced apart side walls 48 and 50 that, in one embodiment, are connected by a floor 52 and end walls 54 and 56. In the illustrated embodiment, the feed box 34 is positioned on top of the troughs 46 and liquid flows downwardly into the troughs 46 through openings 58 in the floor 40 of the feed box 34. Openings may be provided in the side walls 36 and 38 of the feed box 34 to provide an additional or alternative route for liquid to exit the feed box 34 and flow into the troughs 46.

Rather than having the feed box 34 positioned in overlying relationship to the troughs 46, the troughs 46 and feed box 34 may be arranged in coplanar relationship with the troughs 46 extending outwardly from the side walls 36 and 38 of the feed box 34. In this coplanar arrangement, openings are provided in the side walls 36 and 38 of the feed box 34 to allow liquid to flow from the feed box 34 to the troughs 46. It will be appreciated that other methods of delivering liquid to the troughs 46 can be used and are within the scope of the present invention.

A plurality of primary openings 60 are provided in at least one of the side walls 48 or 50 of each trough 46 to allow liquid to exit from the trough 46. The primary openings 60 are positioned at a preselected height above the floor 52 of the trough 46 and the same are spaced apart a preselected distance from each other along the length of the trough 46. The primary openings 60 can be of any desired shape, such as circular, triangular or vertically elongated. The number and size of the openings 60 may be selected to accommodate the anticipated flow rate of liquid through the liquid distributor 16. A series of secondary openings 62 are positioned in the side wall 48 or 50 containing the primary openings 60. The secondary openings 62 are positioned near the top of the side wall 48 or 50 and have a total open area greater than the open area of the underlying primary openings 60. The secondary openings 62 allow for a controlled release of liquid from the trough 46 in the event the liquid flow rate exceeds that which can flow through the primary openings 60. A triangular shape is normally utilized for the secondary openings, but other configurations can be used instead.

In accordance with the present invention, each trough 46 has a baffle distributor 64 that extends along and is spaced outwardly from one or both of the side walls 48 or 50 of the trough 46. The baffle distributor 64 comprises a splash plate 66 positioned to receive the flow of liquid from the primary openings 60 in the trough 46 and a channel 68 positioned under the splash plate 66 to receive the flow of liquid after it impacts against the splash plate 66. The splash plate 66 is preferably coextensive in length with the longitudinal length of the trough 46 and preferably has a vertical height sufficient to receive liquid flow from the secondary openings 62. The splash plate 66 also extends downwardly a sufficient distance to position the attached channel 68 a preselected distance below the floor 52 of the trough 46. The splash plate 66 may extend in parallelism relative to the adjacent side wall 48 or 50 of trough 46, or it may be inclined toward the side wall 48 or 50 in the downward direction.

One or more brackets 70 are used to mount the baffle distributor 64 to the side wall 48 or 50 of the trough 46. Preferably, at least two spaced apart brackets 70 are used to mount the baffle distributor 64 and are constructed to permit vertical adjustment and leveling of the baffle distributor 64. In the illustrated embodiment, the brackets 70 are formed by severing the splash plate 66 along two spaced apart line segments that extend downwardly from the top edge of the splash plate 66. The portion of the splash plate 66 bounded by the severed line segments is then bent away from the plane of the splash plate 66 and then bent again to form an attachment segment 72 that is parallel to the plane of the splash plate 66. A vertically elongated hole 74 is then formed in the attachment segment 72 and an aligned hole 76 is formed in the adjacent side wall 48 or 50 of the trough 46. A nut and bolt assembly 78 extends through the aligned holes 74 and 76 to secure the splash plate 66 to the trough 46, with the vertically elongated hole 74 allowing for adjustment and leveling of the baffle distributor 64. Other methods of attaching the splash plate 66 to the trough 46 can be used and are within the scope of the invention.

The splash plate 66 has a liquid spreading surface 80 that faces the trough 46 and receives the flow of liquid therefrom. The liquid spreading surface 80 may be integrally formed with the splash plate 66 or it may be formed separately and subsequently attached to the splash plate 66. The liquid spreading surface 80 functions to enhance the horizontal spreading of the liquid as it flows downwardly along the splash plate 66. It will be appreciated that this function can be performed in many different ways. For example, as can best be seen in FIG. 3, the liquid spreading surface 80 can be a separate sheet of expanded metal having a vertically oriented diamond pattern that serves to disrupt the downward flow of liquid and redirect it in a lateral direction. Other examples include grooves, projections and the like that are formed in the splash plate 66 and also cause lateral spreading of the liquid. The specific construction of the liquid spreading surface 80 can assume many different forms and remain within the scope of the invention.

The channel 68 that receives liquid from the splash plate 66 is horizontally oriented and preferably extends in parallelism relative to and is coextensive in length with the associated trough 46. The channel 68 is preferably formed by bending a lower portion of the splash plate 66 into a partially circular or at least arcuate transverse cross-sectional configuration. The channel 68 is open at the top to allow entry of liquid from the overlying trough 46, and the same has a plurality of spaced apart discharge holes 82 in the bottom to allow liquid to flow downwardly from the channel 68 into the underlying mass transfer bed 18 at a plurality of spaced apart locations or drip-points. The discharge holes 82 are preferably formed by punching in the direction from the upper surface to the undersurface of the channel 68 so that the raised perimeter that surrounds the punched hole 82 as a result of the punching operation is on the undersurface of the channel 68 where it does not impede entry of liquid into the hole 82. The size and number of discharge holes 82 are selected to provide the desired liquid flow and drip-point density into the underlying mass transfer bed 18. Likewise, the size of the channel 68 is selected to accommodate the desired liquid flow rate. Although the channel 68 is illustrated as having a substantially circular or arcuate shape, other configurations can be used instead. The channel 68 also need not be formed integrally with the splash plate 66, but can be formed as a separate piece and attached by welding or other means to the splash plate 66 and/or trough 46. Preferably, the ends of the channel 68 are closed by end walls 83.

The channel 68 includes a filler 84 formed of a porous and liquid permeable material that facilitates the horizontal distribution of liquid within the channel 68, particularly under low liquid flow rates. The filler 84 can be formed from various materials having a preselected porosity and liquid permeability. For example, woven materials such as rolled wire gauze, gasket rope, rolled cross-woven gasket tape, and combinations thereof can be used for the filler 84. Other materials, including non-woven materials, can be used provided they are compatible with the liquid and have the necessary porosity and liquid permeability. In applications with low liquid flow rates, the filler 84 preferably may have wicking characteristics so that the liquid can be horizontally distributed by capillary action.

The filler 84 is retained within the channel 68 by a series of hold-down brackets 86 that are welded or otherwise secured to the channel 68. The hold-down brackets 86 preferably exert a downward force on the filler 84 to cause it to conform to the configuration of the channel 68 to reduce the quantity of liquid that is able to flow along the upper surface of the channel and enter the discharge holes 82 without first entering the filler 84. The splash plate 66 is preferably aligned with the channel 68 in a manner to cause liquid to drip from a lower edge of the liquid spreading surface 80 onto the filler 84 to facilitate horizontal spreading of the liquid prior to entry into the discharge holes 82.

As can best be seen in FIG. 3, the channel 68 includes an overflow weir 88 opposite from the splash plate 66. The weir 88 preferably has a saw-toothed profile to facilitate a uniformly horizontally distributed overflow of liquid over the weir 88 at high liquid flow rates that exceed the flaw capacity of the discharge holes 82. A saw-toothed drip-edge 90 extends downwardly from the side wall 48 or 50 of the trough 46 to facilitate the horizontal distribution of liquid that flows down the outside of the side wall 48 or 50 after exiting through the primary openings 60, such as at low liquid flow rates, and the secondary openings at higher liquid flow rates. Preferably, the drip-edge 90 is vertically aligned with the channel 68 so that the liquid drips from the drip-edge 90 into the channel 68 for further horizontal distribution before it drips into the underlying mass transfer bed 18. In the event liquid overflows through the secondary openings 62 in the troughs 46, a portion of the liquid is able to bypass the liquid spreading surface 80 by flowing through the cut-out in the splash plate 66 at the location of the brackets 70 and then flowing down the outer face of the splash plate 66.

Returning to FIG. 2, a pair of parallel beams 92 are equally spaced on opposite sides of the feed box 34 and are secured by welding or other means to the top edges of the troughs 46. The beams 92 serve to support and align the troughs 46. Vertically adjustable support clips 94 are positioned on the ends of the beams 92 and feed box 34 to allow the liquid distributor 16 to hang from a support ring (not shown) or other structure mounted on the column shell 12. The beams 92 and support clips 94 are not shown in FIG. 1 to better illustrate the construction of the liquid distributor 16. Other methods of supporting the liquid distributor 16, such as grid supports placed on the underlying mass transfer bed 18, can be used instead.

It can be seen that the baffle distributors 64 operate to create a more uniform horizontal distribution of liquid into the underlying mass transfer bed 18. Liquid that enters the feed box 34 from an overlying zone undergoes an initial mixing and horizontal distribution as it accumulates within the feed box 34. Liquid descends through the openings 58 in the floor 40 of the feed box 34 and enters the underlying troughs 46. As liquid accumulates within the troughs 46, it undergoes further mixing and is horizontally distributed in a direction at a 90° or other preselected angle to the horizontal distribution provided by the feed box 34. Liquid exiting from the primary openings 60 in the troughs 46 enters the channels 68 of the baffle distributors 64, either by first descending along the drip edge 90, descending directly into the channels 68 through the spacing between the splash plate 66 and the trough 46, or by flowing down the liquid spreading surface 80 of the splash plate 66. Both the drip edge 90 and the liquid spreading surface 80 further the horizontal distribution of the liquid prior to entry into the channels 68. Once the liquid enters the channels 68, the filler 84 causes further horizontal distribution of the liquid prior to discharge through the discharge holes 82 in the bottom of the channels 68. As liquid accumulates within the channels 68, it undergoes further mixing and horizontal distribution prior to discharge. The discharge holes 82 provide numerous drip points for well-mixed and well-distributed liquid to enter the underlying mass transfer bed 18, thereby enhancing the mass and or heat transfer occurring within the mass transfer bed. While the baffle distributors 64 have particular applicability in applications where there is a low liquid flow rate, they may also be used at high liquid flow rates as well as at rates in between. At higher liquid flow rates, liquid is able to exit the troughs 46 through the secondary openings 62 and travel downwardly along the same paths as liquid exiting through the primary openings 60. The liquid exiting the secondary openings 62 may also bypass the channels 68 by passing through the cutouts in the splash plates 66 at the locations of the brackets 70. If liquid should overflow the channels 68, the overflow weirs 88 facilitate a more uniform discharge of liquid into the mass transfer bed 18. The positioning of the baffle distributor 64 in relation to the associated trough 46 and the use of the drip edge 90 impede vapor entry into the spacing between the splash plate 66 and the trough 46 where it could cause undesired entrainment of the liquid in the vapor stream.

Variations of the troughs 46 and the baffle distributors are possible and remain within the scope of the present invention. For example, in the embodiment illustrated in FIGS. 5–6, a trough 146 has side walls 148 and 150, end walls 154 and 156, and a centrally sloping generally V-shaped floor 152 rather than the flat floor illustrated with reference to troughs 46. A plurality of primary openings 160 are provided at a preselected elevation in the sloping floor 152 to allow liquid to exit the trough 146 after it has accumulated to a preselected level within the trough 146. This trough design allows solids and other debris that may be present in the liquid to accumulate in the valley created by the sloping floor 152 without plugging the primary openings 160.

Figure 5:
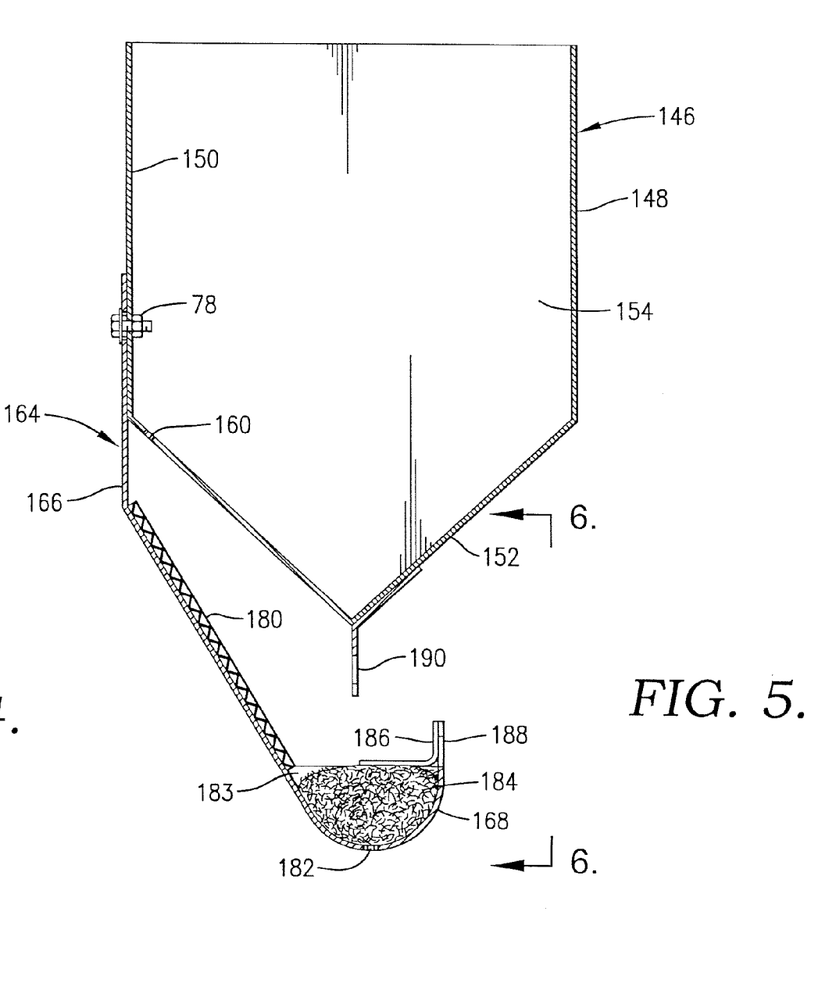
FIG. 5 is an end elevation view of an alternate embodiment of a trough and baffle distributor taken in vertical section.
Figure 6:
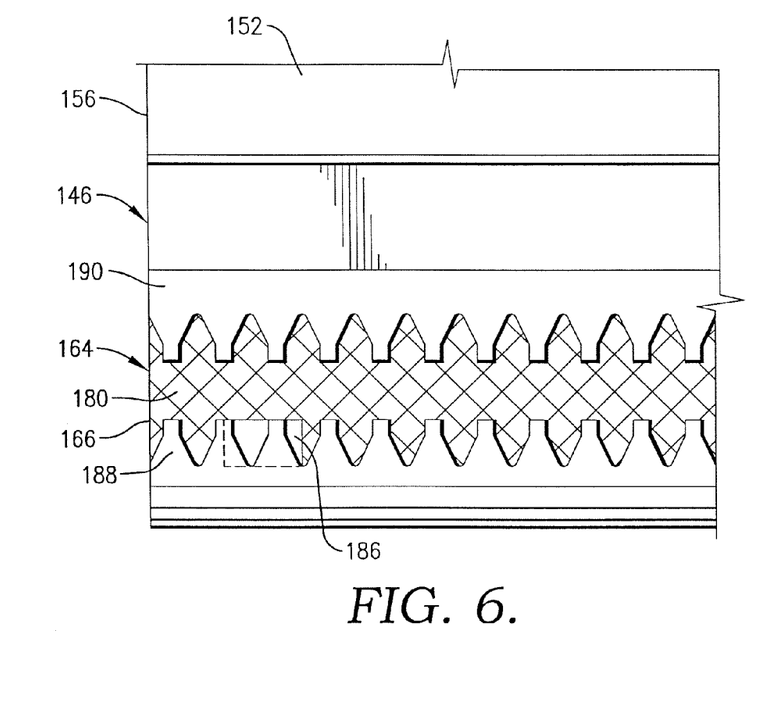
FIG. 6 is a fragmentary side elevation view of the trough and baffle distributor taken along line 6—6 of FIG. 5.

A baffle distributor 164 similar to the one previously discussed is used in conjunction with troughs 146. The baffle distributor 164 has a splash plate 166 connected to a channel 168 at its lower end and mounted at its upper end to one of the side walls 148 or 150 by a nut and bolt assembly 78. A liquid spreading surface 180 is provided on the splash plate 166 to receive and horizontally distribute liquid exiting the troughs 146 through the primary openings 160. The splash plate 166 delivers liquid to a filler 184 in the channel 168 that serves to facilitate the horizontal distribution of liquid in the manner previously described. Discharge holes 182 are provided at the low point in the channel 168 to allow liquid to drip from the channel at preselected drip-points and descend into the underlying mass transfer bed 18. The channel 168 preferably includes end walls 183 that facilitate the accumulation of liquid within the channel 168 to further the mixing and horizontal distribution of the liquid prior to discharge through the discharge holes 182. Hold-down brackets 186 and overflow weirs 188 of the types previously described are also provided with baffle distributors 164. A saw-toothed drip edge 190 is also mounted to an undersurface of the floor 152 of trough 146 at a location to receive liquid flowing along the undersurface of the floor 152 and distribute it to either the liquid spreading surface 180 or the filler 184. The operation of the baffle distributor 164 will be readily understood from the previous description with respect to baffle distributor 64.

Figure 7:
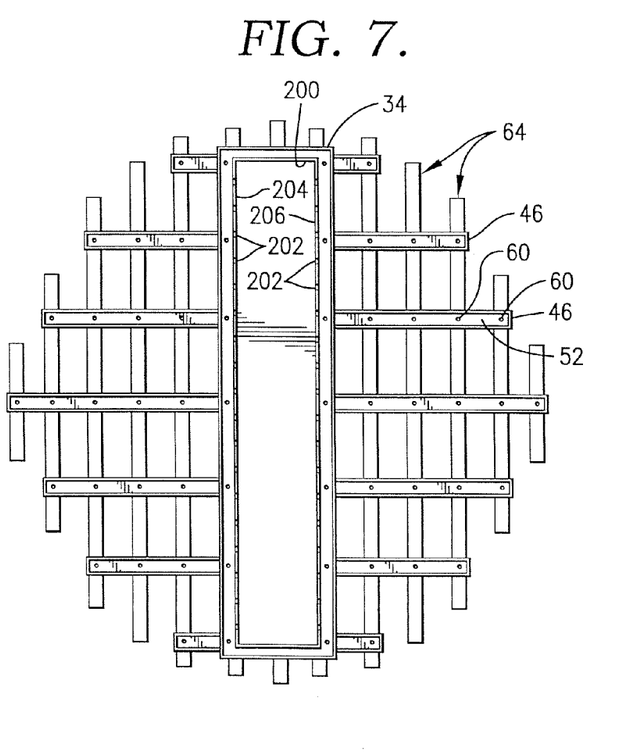
FIG. 7 is a top plan view of another embodiment of the liquid distributor of the present invention, with the baffle distributors being shown schematically.
Figure 8:
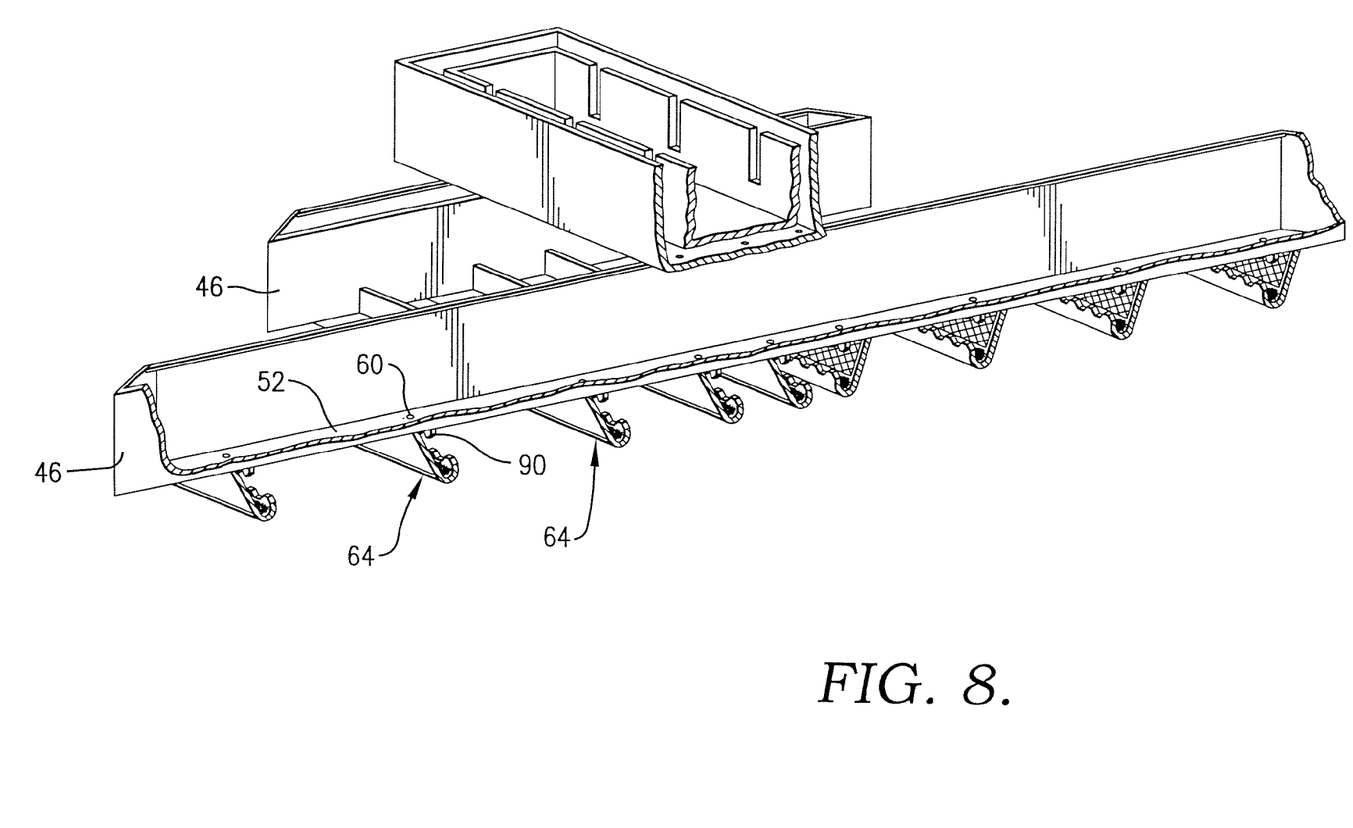
FIG. 8 is a fragmentary top perspective view of the liquid distributor shown in FIG. 7, with portions broken away to illustrate details of construction.

Turning now to FIGS. 7 and 8, a predistributor trough 200 is provided within the feed box 34 previously described. The predistributor trough 200 has a plurality of slots 31 formed in its side walls 33 and 35 to calm and facilitate the horizontal distribution of liquid as it flows into the feed box 34. The feed box 34, in turn, feeds liquid to the troughs 46 and the baffle distributors 64 which are illustrated schematically.

FIGS. 7 and 8 also illustrate an alternate arrangement of the baffle distributors 64 in relation to the troughs 46. Rather than extending parallel to the troughs 46 as was the case with the previously described arrangements, the baffle distributors 64 extend transversely, preferably perpendicularly, across two or more troughs 46 to facilitate a horizontal distribution of liquid in the transverse direction, thereby allowing mixing of liquid from two or more troughs 46 prior to distribution to the underlying mass transfer bed 18. In addition, by extending the baffle distributors at an angle to the troughs 46, the number of baffle distributors 64 may be more or fewer than the number of troughs 46. In the arrangement illustrated in FIGS. 7 and 8, the primary openings 60 are provided in the floor 52 of the troughs 46 and the drip edges 90 are spaced from the baffle distributors 64 on the opposite side of the primary openings 60. Again, the splash plate 66 of each baffle distributor 64 may extend vertically or at an angle to the vertical.

Figure 9:
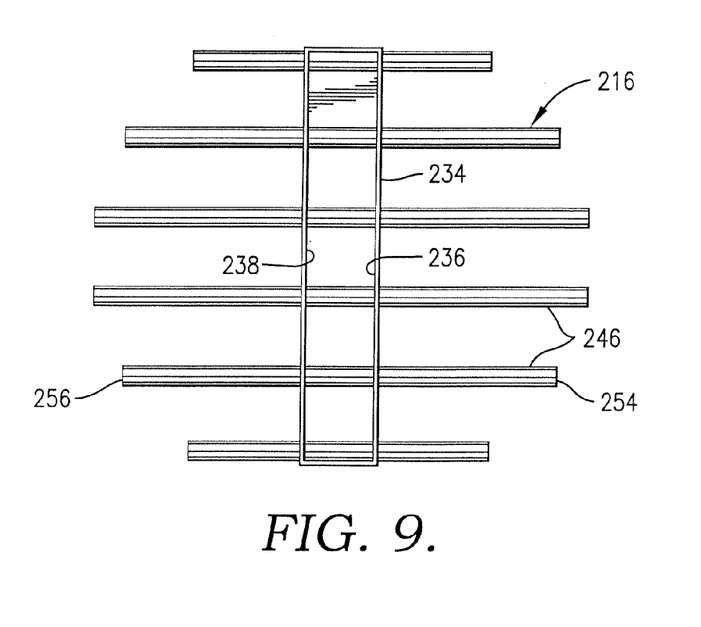
FIG. 9 is a top plan view of a still further embodiment of the liquid distributor of the present invention.
Figure 10:
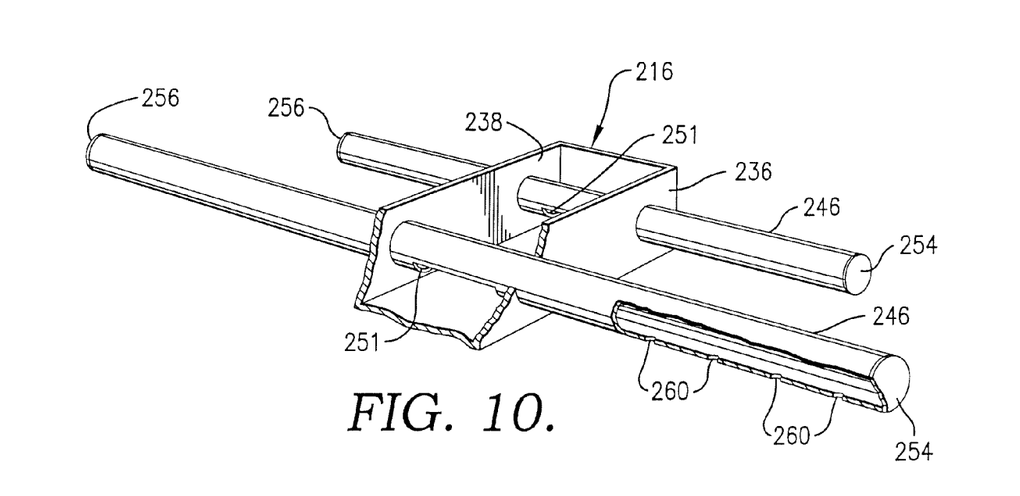
FIG. 10 is a fragmentary top perspective view of a feed box and troughs of the liquid distributor shown in FIG. 9, with portions broken away to show construction details.

A still further variation of the present invention is illustrated in FIGS. 9 and 10 in which a liquid distributor 216 has cylindrical troughs 246 that extend horizontally through the side walls 236 and 238 of the feed box 234. Each cylindrical trough 246 is closed on its ends by caps 254 and 256 and has a bottom cutout 251 in that portion of the trough 246 positioned within the feed box 234. The cutout 251 allows for liquid in the feed box 234 to enter the cylindrical trough 246 and then exit the cylindrical trough 246 through a plurality of longitudinally spaced apart primary openings 260 located in the bottom of the cylindrical trough 246 outside of the feed box 234. In this manner, liquid exiting the cylindrical troughs 246 through the primary openings 260 is more uniformly horizontally distributed across the underlying mass transfer bed 18. If desired, baffle distributors 64 of the type previously described may extend transversely across two or more cylindrical troughs 246 to further facilitate a horizontal mixing and distribution of the liquid.

From the foregoing, it will be seen that this invention is one well adapted to attain all of the ends and objectives hereinabove set forth, together with other advantages that are inherent to the structure described and disclosed.

It will be understood that certain features and subcombinations are of utility and may be employed separately and without reference to other features and subcombinations. This is contemplated by and is within the scope of the claims.

Since many possible embodiments may be made of the invention disclosed herein without departing from the scope thereof, it is to be understood that all matter set forth herein or shown in the accompanying drawings is to be interpreted as illustrative and not in a limiting sense.

We claim:

1. A flow distributor for liquid descending in a vertically elongated process column having an internal space, said distributor comprising:
   a plurality of elongated liquid distribution troughs configured and arranged in generally parallel and coplanar relationship for being mounted in a said column in a position to extend transversely of the column in the internal space, each of said troughs including an outer wall defining an elongated, internal fluid distribution chamber, there being at least one hole extending through said wall of each trough at a location to permit liquid to escape from said trough through said hole; and
   a plurality of baffle distributor structures each including an elongated, downwardly extending distributor plate member extending transversely across two or more of said troughs in a position such that at least a portion of a surface thereof is contacted by liquid escaping from said two or more troughs through said holes.

2. A flow distributor as set forth in claim 1, wherein each of said baffle distributor structures includes an elongated, fluid receiving element attached at a lower edge portion of said plate member, said fluid receiving element including an elongated fluid distribution channel extending longitudinally of the plate member.

3. A flow distributor as set forth in claim 2, wherein is included a plurality of elongated drip elements carried by the troughs, each of said drip element extending transversely across two or more of the troughs and downwardly therefrom and having a lower longitudinally extending drip edge.

4. A flow distributor as set forth in claim 3, wherein each of said distributor plate members includes a liquid spreading element at a lower area of said surface disposed beneath said portion.

5. A flow distributor as set forth in claim 1, wherein the number of troughs present is different than the number of baffle distributor structures present.

6. A flow distributor as set forth in claim 5, wherein the number of baffle distributor structures is greater than the number of troughs.

7. A flow distributor as set forth in claim 4, wherein said fluid receiving element has an upwardly extending outer edge disposed at an opposite side of said channel from said lower edge portion of the plate member.

8. A flow distributor as set forth in claim 7, wherein said fluid receiving element includes a porous, liquid permeable filler material disposed in said channel.

9. A flow distributor as set forth in claim 8, wherein said fluid receiving element includes structure for holding said filler material in place.

* * * * *